United States Patent
Smirnov

(10) Patent No.: US 9,027,585 B2
(45) Date of Patent: May 12, 2015

(54) ADAPTIVE PRESSURE INSENSITIVE MASS FLOW CONTROLLER AND METHOD FOR MULTI-GAS APPLICATIONS

(75) Inventor: Alexei V. Smirnov, Fort Collins, CO (US)

(73) Assignee: Hitachi Metals, Ltd., Tokyo (JP)

( * ) Notice: Subject to any disclaimer, the term of this patent is extended or adjusted under 35 U.S.C. 154(b) by 653 days.

(21) Appl. No.: 13/324,175

(22) Filed: Dec. 13, 2011

(65) Prior Publication Data

US 2013/0146148 A1 Jun. 13, 2013

(51) Int. Cl.
*F17D 1/16* (2006.01)
*G05D 7/06* (2006.01)

(52) U.S. Cl.
CPC .............. *F17D 1/16* (2013.01); *G05D 7/0635* (2013.01)

(58) Field of Classification Search
USPC ................................ 137/486, 487.5; 700/282
See application file for complete search history.

(56) References Cited

U.S. PATENT DOCUMENTS 7,640,078 B2 * 12/2009 Smirnov ...................... 700/282
2008/0009978 A1   1/2008 Smirnov

OTHER PUBLICATIONS

Nakamura, Yukari, "Internaitonal Preliminary Report on Patentability re Application No. PCT/US2012/063654", Jun. 26, 2014, p. 7 Published in: CH.
Mitrovic, B., "International Search Report and Written Opinion re Application No. PCT/US2012/063654", Dec. 11, 2012, Published in: AU.

* cited by examiner

*Primary Examiner* — Eric Keasel
(74) *Attorney, Agent, or Firm* — Neugeboren O'Dowd PC

(57) ABSTRACT

A system and method for controlling a flow of a fluid using a multi-mode control algorithm is described. The method includes disengaging and engaging a feedback control loop that controls a valve of the mass flow controller based upon a rate of pressure change of the fluid. The method also includes calculating a valve position of the valve based on pressure measurements when the feedback control loop has been disengaged and characterization data that characterizes the mass flow controller, and determining, when the feedback control loop is first re-engaged, a difference between a measured flow rate and a flow set point. An adjustment to the characterization data is applied based upon the difference to improve an accuracy of the calculation of the valve position when the feedback control loop is disengaged again.

11 Claims, 6 Drawing Sheets

Pressure Measurement

Parasitic Flow

Flow Sensor Measurement

Compensated Flow

Valve Position

Actual Flow

ADAPTIVE PRESSURE INSENSITIVE MASS FLOW CONTROLLER AND METHOD FOR MULTI-GAS APPLICATIONS

FIELD OF THE INVENTION

The present invention relates to control systems, and in particular, but not by way of limitation, the present invention relates to systems and methods for controlling a flow of a fluid.

BACKGROUND OF THE INVENTION

A closed-loop control algorithm, if properly tuned, can be used to adjust a flow of a fluid in response to changes in fluid flow conditions that cause deviations away from a specified fluid flow set point. Changes in fluid flow conditions are often caused by variations in, for example, pressure, temperature, etc. Deviations away from the specified fluid flow set point caused by these variations are detected and corrected for based on measurements (e.g., feedback signal) generated by a sensing device (e.g., flow sensor measurements from a flow sensor) within a feedback loop of the closed-loop control algorithm.

When fluid flow conditions, however, change rapidly as a result of, for example, rapid pressure changes, sensing devices used by the feedback loop may saturate or produce unreliable feedback signals. If a flow controller, for example, uses these saturated and/or unreliable feedback signals within the closed-loop control algorithm, the flow controller may not deliver the fluid according to the specified fluid flow set point. The flow controller may, for example, over-compensate or under-compensate for changes in fluid flow conditions based on the unreliable feedback signals. Accordingly, a need exists for a method and/or apparatus to provide new and innovative features that address the shortfalls of present methodologies in responding to rapid changes in fluid flow conditions.

SUMMARY OF THE INVENTION

Exemplary embodiments of the present invention that are shown in the drawings are summarized below. These and other embodiments are more fully described in the Detailed Description section. It is to be understood, however, that there is no intention to limit the invention to the forms described in this Summary of the Invention or in the Detailed Description. One skilled in the art can recognize that there are numerous modifications, equivalents and alternative constructions that fall within the spirit and scope of the invention as expressed in the claims.

Aspects of the present invention can provide a method for controlling mass flow of a fluid. The method includes receiving a pressure measurement of the fluid generated by a pressure sensor, and disengaging, responsive to a rate of pressure change of the fluid satisfying a threshold condition, a feedback control loop that controls a valve of the mass flow controller based upon a difference between a measured flow rate and a set point. A valve position is calculated based on pressure measurements when the feedback control loop has been disengaged and characterization data that characterizes the mass flow controller. When the flow measurement is accurate after one of a time period or threshold condition is met, the feedback control loop is re-engaged. And when the feedback control loop is first re-engaged, a difference between a measured flow rate and a flow set point is determined. An adjustment to the characterization data is then applied based upon the difference to improve an accuracy of the calculation of the valve position when the feedback control loop is disengaged again.

In other embodiments the invention may be characterized as a mass flow controller that includes a valve that is adjustable to control a flow rate of a fluid responsive to a control signal, a pressure transducer that provides a pressure signal that indicates a pressure of the fluid, a memory to store characterization data that characterizes the mass flow controller, a thermal mass flow sensor that provides a measured flow rate of the fluid, and a control system that disengages a feedback control loop when a rate of pressure change of the fluid satisfies a threshold condition, and when the feedback control loop has been disengaged, the control system controls the valve based upon the pressure signal and characterization data is adjusted based upon any differences between set point signals and corresponding measured flow signals obtained each time feedback control loop is re-engaged.

BRIEF DESCRIPTION OF THE DRAWINGS

Various objects and advantages and a more complete understanding of the present invention are apparent and more readily appreciated by reference to the following Detailed Description and to the appended claims when taken in conjunction with the accompanying Drawings wherein

DETAILED DESCRIPTION

In accordance with several embodiments, the present invention is directed to mass flow controllers and methods that change from a closed-loop mode (a mode that is based on closed-loop control) to an open-loop mode (a mode that is based on an open-loop control) when a threshold condition is satisfied (e.g., when an environmental-parameter-value or a time-based value meets a threshold value), and then adapt the open-loop mode during operation to reduce deficiencies (e.g., control errors) that may occur during operation (e.g., due to different process gases being used).

Embodiments of the mass flow controllers discussed herein are configured to change from the closed-loop mode to the open-loop mode when one or more disturbances, such as a sudden pressure change, cause unreliable feedback measurements (e.g., due to parasitic flow) that are used in a feedback loop of the closed-loop mode. When the disturbance(s) have subsided or after a defined period of time, a control system of the mass low controller is configured to change from the open-loop mode back to the closed-loop mode.

The threshold condition is generally defined so that the multi-mode control system changes (e.g., adapts) from the closed-loop mode to the open-loop mode when, for example, values measured by the flow sensor for the feedback loop of the closed-loop mode are outside of the normal operating range of the sensor and cannot be reasonably relied on within the feedback loop (e.g., near the saturation value of a flow sensor). In several embodiments the threshold condition is related to one or more values that are calculated based on one or more measurements from the sensor. In some embodiments for example, the multi-mode control system is changed from the closed-loop mode to the open-loop mode when a pressure change exceeds a defined threshold condition.

In some embodiments, a flow controller uses a set point indicator and a flow sensor indicator in the feedback loop when the multi-mode control system is in the closed-loop mode to control, for example, a flow of a fluid by adjusting a position of a valve (e.g., variable valve). In many embodiments, the closed-loop mode/closed-loop control algorithm is based on some combination of proportional-integral-derivative (PID) control and the feedback loop is based on a measurement (e.g., flow measurement or flow sensor indicator) from a sensor such as a flow sensor. When the multi-mode control system changes to, for example, the open-loop mode, the control algorithm uses a mathematical relationship to determine the position of the valve to control, for example, the flow of the fluid. In some embodiments discussed further herein, the mathematical relationship is based on, for example, flow/valve sensitivity data characterized during a calibration procedure.

Figure 1:
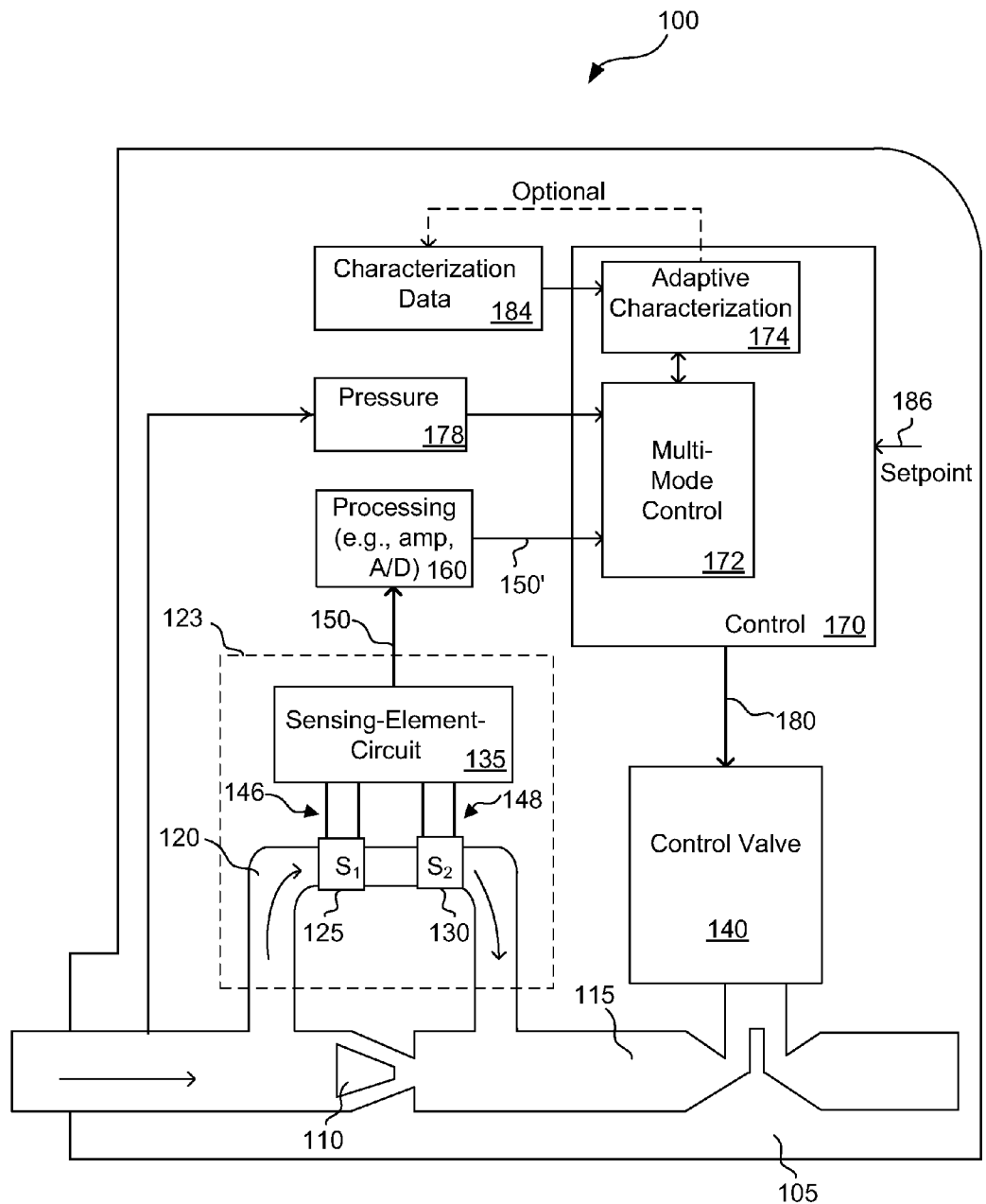
FIG. 1 is a block diagram that illustrates an exemplary mass flow controller that utilizes a multi-mode control approach to control a flow of a fluid according to an embodiment of the invention.

Referring now to the drawings, FIG. 1 illustrates a mass flow controller (MFC) 100 that uses a multi-mode control methodology to control a flow of a fluid (e.g., from a fluid dispenser to a reaction vessel). The illustrated arrangement of these components is logical and not meant to be an actual hardware diagram. Thus, the components can be combined, further separated, deleted and/or supplemented in an actual implementation. As one of ordinary skill in the art will appreciate, the components depicted in FIG. 1 may be implemented in hardware, firmware, software, or any combination thereof. Moreover, in light of this specification, the construction of each individual component is well known within the skill of those of ordinary skill in the art.

In some embodiments, the fluid controlled by the MFC 100 is a liquid (e.g., sulfuric acid) and in other embodiments a gas (e.g., nitrogen), but a person skilled in the art will appreciate, having the benefit of this disclosure, that the fluid being delivered by the MFC 100 may be any kind of fluid including, for example, a mixture of elements and/or compounds in any phase, such as a gas or a liquid. Depending upon the application, the MFC 100 may deliver a fluid in a gaseous state (e.g., nitrogen) and/or a liquid state (e.g., hydrochloric acid) to, for example, a tool in a semiconductor facility. The MFC 100 in many embodiments is configured to deliver a fluid under high pressure, low temperature, or to different types of containers or vessels.

As depicted, in the present embodiment a base 105 of MFC 100 includes bypass 110 through which a gas flows. Bypass 110 directs a constant proportion of gas through main path 115 and sensor tube 120. As a consequence, the flow rate of the fluid (e.g., gas or liquid) through the sensor tube 120 is indicative of the flow rate of the fluid flowing through the main path of the MFC 100.

In this embodiment, the sensor tube 120 is a small bore tube that is part of a thermal mass flow sensor 123 of the MFC 100. And as shown, sensing elements 125 and 130 are coupled to (e.g., wound around) the outside of sensor tube 120. In one illustrative embodiment, sensing elements 125 and 130 are resistance-thermometer elements (e.g., coils of conductive wire), but other types of sensors (e.g., resistance temperature detectors (RTD and thermocouples) may also be utilized. Moreover, other embodiments may certainly utilize different numbers of sensors and different architectures for processing the signals from the sensors without departing from the scope of the present invention.

As depicted, sensing elements 125 and 130 are electrically connected to a sensing-element circuit 135. In general, the sensing-element circuit 135 is configured (responsive to signals 146, 148 from the sensing elements 125, 130) to provide an output signal 150, which is indicative of the flow rate through the sensor tube 120, and hence, indicative of the flow rate through the main path 115 of the MFC 100.

As shown in FIG. 1, the output signal 150 may be processed by processing portion 160 to generate a processed-representation 150' of the output signal 150. For example, the processed-representation 150' may be a digital representation of the output signal 150. More specifically, the processing portion 160 may amplify and convert, using an analog to digital converter, the output signals 150 to a digital representation of the output signal 150.

As one of ordinary skill in the art will readily recognize, the processing portion 160 may also adjust the output signal 150 (e.g., by adjusting the signal 150 with predetermined calibration coefficients) based upon physical characteristics of the MFC 100 and/or characteristics of the fluid (e.g., gas) flowing through the MFC 100.

The control component 170 in this embodiment is part of a control system that includes sensing elements 125 and 130, sensing-element circuit 135, and the processing portion 160. The control component 170 is generally configured to generate a control signal 180 to control a position of the control valve 140 in order to provide a flow rate based upon a set point signal 186, and as discussed further herein, the control component 170 operates in both a closed-loop mode and an adaptive open-loop mode to provide improved control over a variety of operating conditions (e.g., across pressure swings). The control valve 140 may be realized by a piezoelectric valve or solenoid valve, and the control signal 180 may be a voltage (in the case of a piezoelectric valve) or current (in the case of a solenoid valve).

And as shown, the control component 170 in this embodiment includes a multi-mode control component 172 and an adaptive characterization component 174 that is coupled to characterization data 184. As one of ordinary skill in the art, in view of this disclosure will appreciate, the control component 170 may be realized by a variety of components including software (e.g., stored in non-volatile memory), hardware and/or firmware or combinations thereof, and the components may store and execute non-transitory processor readable instructions that effectuate the methods described further herein.

In general, the multi-mode control component 172 operates to alternate the operation of the mass flow controller 100 between a closed-loop mode and an open-loop mode depending upon conditions that affect the output 150, 150' of the thermal flow sensor 123. In some instances, operating conditions affect the mass flow controller 100 to such an extent that the output 150, 150' of the thermal flow sensor 123 cannot be reasonably be relied on, and as a consequence, the multi-mode control component 172 operates in an open-loop mode.

As shown in the embodiment depicted in FIG. 1 for example, the multi-mode control component 172 is coupled to receive indications of the fluid pressure from a pressure sensor 178, and the multi-mode control component 172 is configured to change from the closed-loop mode to the open-loop mode when a disturbance(s), such as a sudden pressure changes, cause the thermal flow sensor 123 to generate an unreliable signal 150.

The multi-mode control component 172 changes from the closed-loop mode to the open-loop mode, for example, by disengaging the closed-loop control algorithm and engaging the open-loop control algorithm. When the disturbance(s) has subsided or after a defined period of time, the multi-mode control component 172 is configured to change from the open-loop mode back to the closed-loop mode. In many implementations the pressure change threshold condition that triggers the open-loop control mode is defined so that the multi-mode control component 172 changes from the closed-loop to the open-loop mode at or near the upper boundary of the operating range of the flow sensor 123.

In some embodiments, when changing from the open-loop mode to the closed-loop mode, the flow controller 100 uses the fluid flow set point 186 and flow sensor measurements 150' in specified proportions as the feedback signal for the closed-loop control to create a smooth transition from the open-loop mode back to the closed-loop mode. This transition technique (also referred to as a "bumpless" transition) is appropriate when the fluid flow rate is not at, or substantially at, the fluid flow set point after operating for a period of time in the open-loop mode. In some implementations, bumpless transitions techniques are used to change the open-loop mode to the closed-loop mode and vice versa.

U.S. Pat. No. 7,640,078 entitled Multi-mode Control Algorithm, which is incorporated herein in its entirety by reference, discloses additional details relative to multi-mode control of an MFC, which embodiments of the present invention enhance.

In alternative embodiments, the thermal flow sensor 123 may be realized by a laminar flow sensor, coriolis flow sensor, ultrasonic flow sensor or differential pressure sensor are utilized. And the pressure sensor 178 is realized, for example, by a gage pressure sensor, differential sensor, absolute pressure sensor or piezoresistive pressure sensor. In variations, the thermal flow sensor 123 and/or pressure sensor 178 are used in combination with any combination of other sensors (e.g., temperature sensors) to accurately measure the flow of the fluid. These combinations are used, for example, in the feedback loop in the closed-loop mode or in the open-loop mode to control fluid flow and/or determine whether to change the multi-mode control algorithm from one mode to another.

In some embodiments, the flow controller 100 receives and uses an indicator from another device or sensor such as a temperature sensor (not shown) for determining multi-mode changes and/or to control the flow of the fluid. In several embodiments, one or more of the sensors are located downstream from the flow controller 100 rather than upstream from the flow controller 100.

FIGS. 2A through 2F are graphs that show exemplary measurements, signals, and calculated values related to an exemplary pressure change that triggers a change in operation of the multi-mode control component 172 from a closed-loop mode to an open-loop mode. The graphs in FIGS. 2A through 2F show time on their respective x-axes and various measurements and calculated values on their respective y-axes. These graphs depict operational aspects of the multi-mode control discussed in U.S. Pat. No. 7,640,078, but these graphs facilitate an understanding of embodiments of the present invention, and as a consequence, are discussed herein in connection with embodiments of the present invention.

Figure 2A:
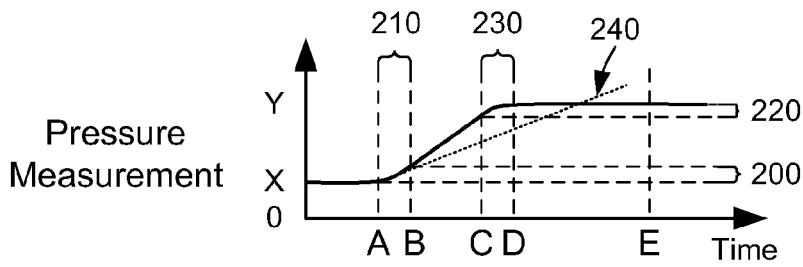
FIG. 2A is a graph that shows a pressure measurement as indicated by a pressure sensor, according to an embodiment of the invention.

FIG. 2A is a graph that shows a pressure measurement as indicated by a pressure sensor indicator from a pressure sensor. FIG. 2A shows a change in pressure from X at time A to Y at time D. FIG. 2A shows that the rate of change of the pressure between times A and C exceeds the threshold pressure change rate value indicated by a slope of line 240. The excessive rate of pressure change with respect to the threshold value was detected at time B based on the pressure change 200 over time period 210. The detection of the excessive rate of pressure change at time B prompts the multi-mode control component 172 to switch from the closed-loop mode to the open-loop mode. Between times C and D, the pressure change rate (as indicated by the pressure change 220 over time period 230) drops below the threshold pressure change rate indicated by the slope of line 240. As a result, at time D, the multi-mode control component 172 changes from the open-loop mode back to the closed-loop mode.

In summary, the pressure measurement profile in FIG. 2A shows that the multi-mode control component 172 is operating in the closed-loop mode before time B, in the open-loop mode between times B and D, and in the closed-loop mode after time D. All of the changes into the various modes are triggered by pressure change rates either exceeding or falling below the threshold pressure rate change threshold value indicated by the slope of line 240.

Figure 2B:
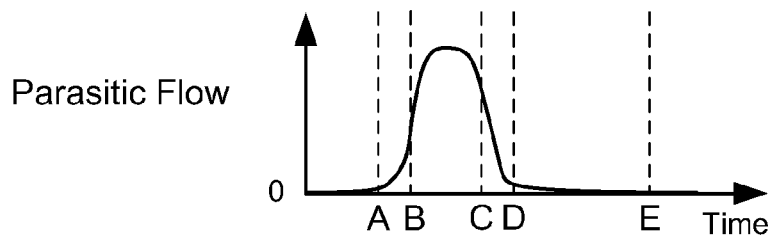
FIG. 2B is a graph that shows a value of a parasitic flow caused by a pressure change, according to an embodiment of the invention.

FIG. 2B is a graph that shows a parasitic flow resulting from the pressure changes shown in FIG. 2A. FIG. 2B shows that at time A the parasitic flow starts to increase when the pressure starts to increase as shown in FIG. 2A. At time B in FIG. 2A, the parasitic flow increases dramatically as the rate of pressure increases as shown in FIG. 2B. At time C, as a result of the rate of pressure change slowing down as shown in FIG. 2A, the parasitic flow in FIG. 2B decreases dramatically until the parasitic flow disappears shortly after time D.

Figure 2C:
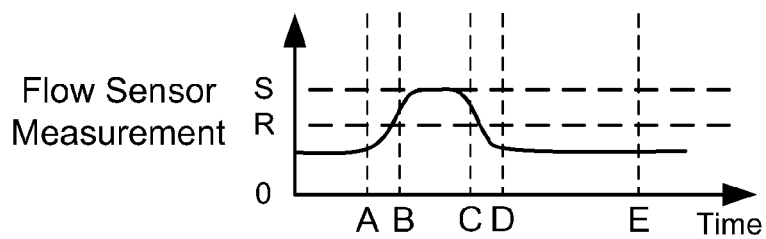
FIG. 2C is a graph that shows a flow sensor measurement from a flow sensor, according to an embodiment of the invention.

FIG. 2C is a graph that shows flow sensor readings/measurements of the flow of the fluid. FIG. 2C includes the parasitic flow shown in FIG. 2B. The operating range of the flow sensor is shown on the graph between flow sensor measurements 0 and R. Flow sensor measurements above flow sensor measurement R on the y-axis are less reliable and the flow sensor saturates at flow sensor measurement S. FIG. 2C shows that the threshold pressure change rate value has been chosen such that at time B, shortly after flow sensor measurements reach the unreliable range, the control system is changed to operate in the open-loop mode. FIG. 2C shows that the threshold pressure change rate value has been chosen such that at time D, after flow sensor measurements are back in the specified operating range of the flow sensor, the control system switches back from the open-loop mode to the closed-loop mode.

Figure 2D:
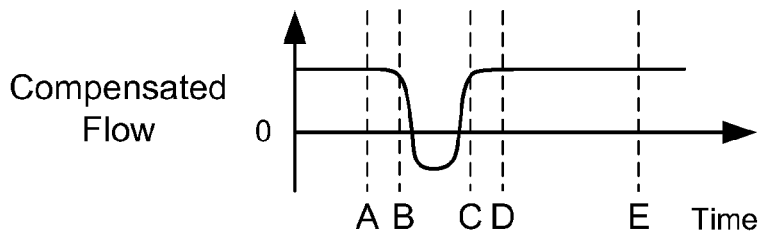
FIG. 2D is a graph that shows a compensated flow in response to a pressure change, according to an embodiment of the invention.

FIG. 2D is a graph that shows compensated flow based on the parasitic flow in FIG. 2B if the multimode control component 172 did not change from closed-loop mode to open-loop mode. Without the change from the closed-loop mode to the open-loop mode, FIG. 2D shows that the flow controller would be errantly over-compensated (particularly between times B and C) for the parasitic flow in FIG. 2B that is caused by the pressure change in FIG. 2A.

Figure 2E:
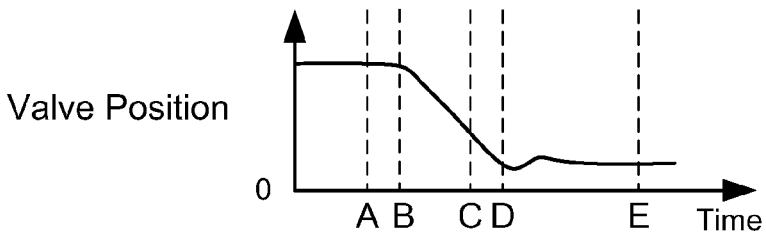
FIG. 2E is a graph that shows a valve position of a valve that is controlled by a flow controller implementing a multi-mode control approach, according to an embodiment of the invention.

FIG. 2E is a graph that shows a valve position of the control valve 140, and as shown, the valve position is controlled between times B and D in the open-loop control mode according to a mathematical relationship that correlates pressure measurements with valve positions. FIG. 2E shows that when the multi-mode control component 172 changes from the open-loop mode to the closed-loop mode after time D, the closed-loop control corrects for a slight overshoot in valve position when the multi-mode control component 172 is operated in the open-loop mode.

Figure 2F:
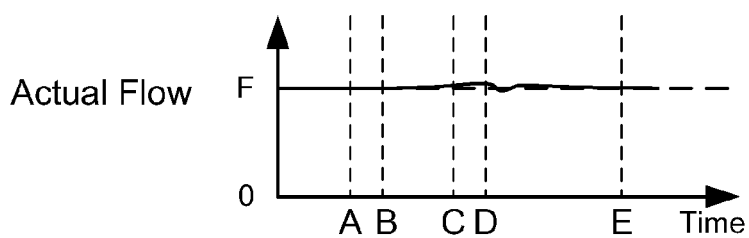
FIG. 2F is a graph that shows an actual flow of a fluid through a valve that is controlled using the multi-mode control approach, according to an embodiment of the invention.

FIG. 2F is a graph that shows an actual flow of fluid through the valve that is controlled using the multi-mode control component 172. FIG. 2F shows that the actual fluid flow measurement, because of the changing between the closed-loop and open-loop modes, tracks closely with the specified fluid flow set point shown on the y-axis at F. If operating in only the closed-loop mode, the actual flow would have diverged significantly from the fluid flow set point because of grossly over-compensated flow (similar to that shown in FIG. 2D) based on the unreliable and/or saturated measurements from the flow sensor as shown in FIG. 2C.

Although the graphs in FIGS. 2A through 2F are discussed in connection with a pressure increase, in several implementations, the multi-mode control component 172 is configured to change from the closed-loop mode to the open-loop mode when pressure decreases rapidly and causes a negative parasitic flow. A person of ordinary skill in the art, in view of this disclosure, will appreciate that the principles applied in FIGS. 2A through 2F are similarly applied to a scenario involving decreasing pressure.

The characterization data 184, which may reside in nonvolatile memory, is utilized by the multi-mode control component 172 to control a position of the control valve 140 during the open-loop mode to convert one or more pressure readings from the pressure sensor 178 into a valve position that provides a fluid flow rate that is sufficiently close, or equal, to the fluid flow level corresponding to the setpoint 186. In many embodiments the characterization process to generate characterization data 184 is performed as part of a manufacturing process (e.g., carried out by a manufacturer or supplier of the MFC 100) before the mass flow controller 100 is utilized in a processing environment.

In many instances, for example, instead of attempting to characterize the MFC 100 relative to several potential process gases, which is a time consuming and costly process, the characterization is carried out using nitrogen gas ($N_2$). Although nitrogen is identified throughout this disclosure as an exemplary gas that may be used during characterization, it should be recognized that other gases may be utilized as a characterization gas, but it has been found that nitrogen is an effective (e.g., in terms of cost and functionality) gas to use during characterization.

Figure 3A:
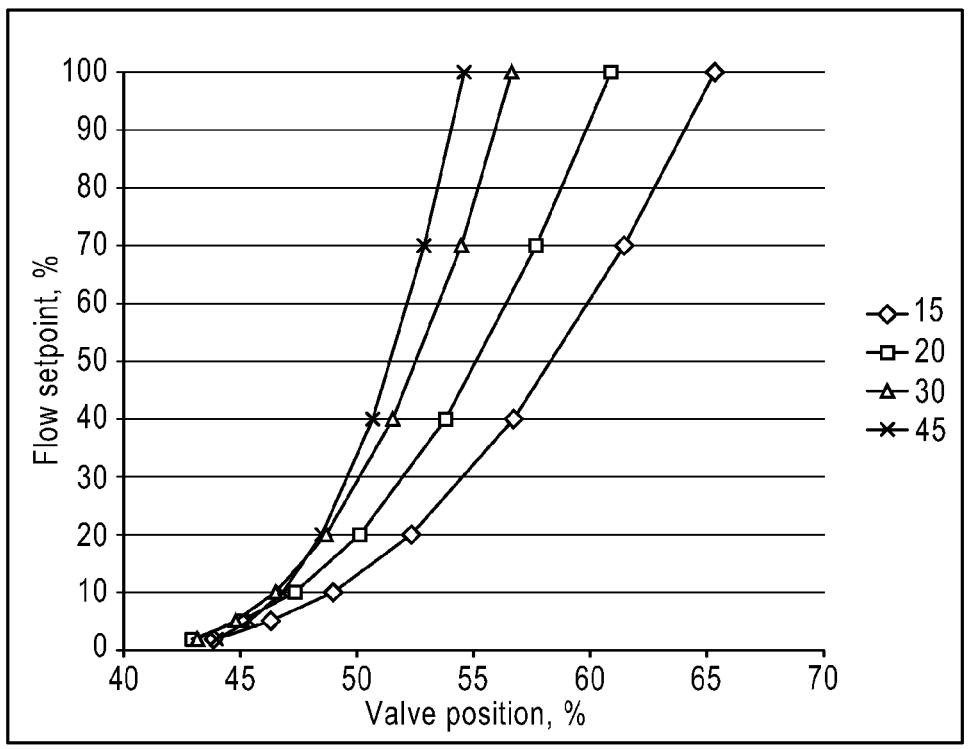
FIG. 3A is a graph depicting exemplary characterization data.

Referring to FIG. 3A shown is exemplary characterization data 184 that is depicted as data points in a graph. As shown, the characterization data 184 may include, for each of a plurality of pressures, a collection of data pairs that include a flow value (in terms of a percentage of a maximum flow) and valve position value (in terms of a percentage of a maximum valve position).

Figure 3B:
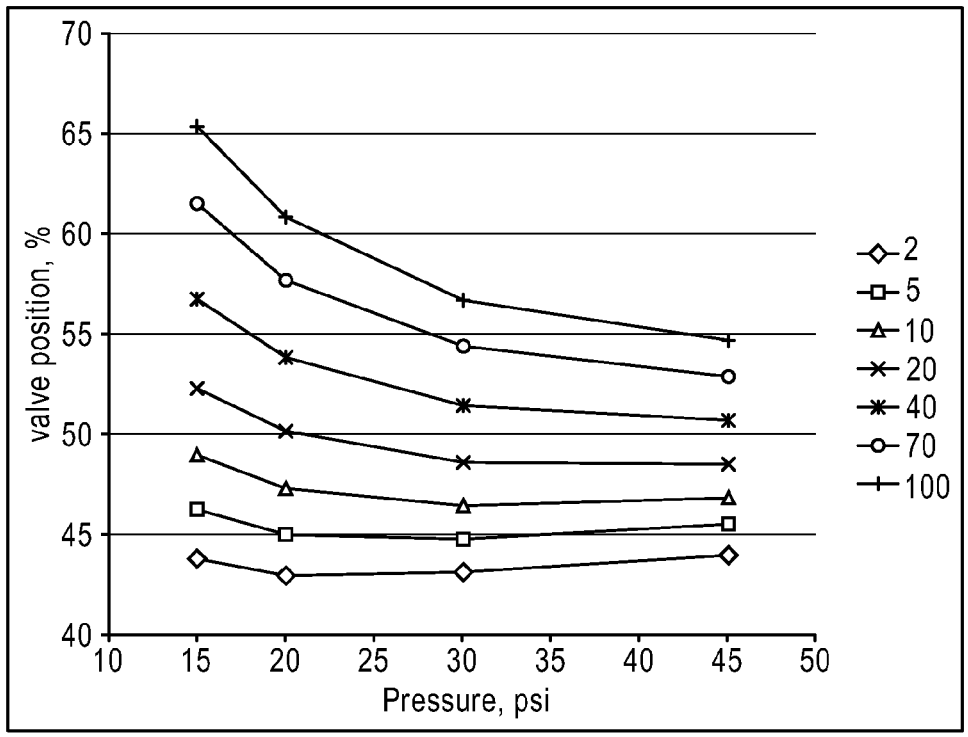
FIG. 3B is another graph depicting another format of the characterization data.

FIG. 3B depicts the characterization data 184 discussed with reference to FIG. 3A in a different format to show how the multi-mode control component 172 controls the valve position during open-loop mode to maintain constant flow by converting one or more pressure readings from the pressure sensor 178 into a valve position. This data is obtained during device characterization using nitrogen, and as a consequence, the mass flow controller 100 exhibits good pressure insensitivity when nitrogen is the process gas.

Figure 4A:
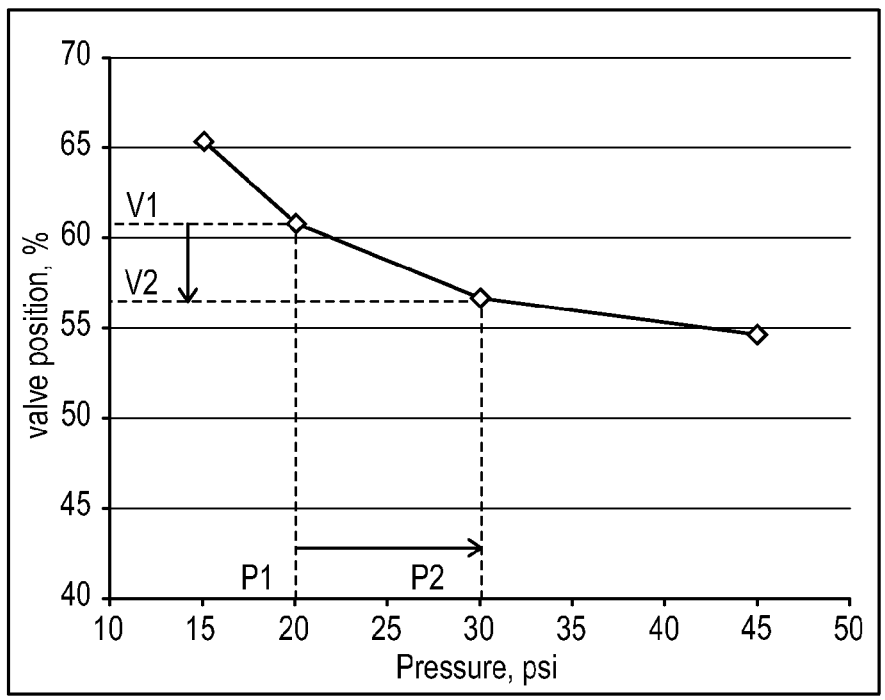
FIG. 4A is a graph depicting an exemplary control profile of the control valve in FIG. 1 versus pressure.

Referring to FIG. 4A, it is a graph depicting exemplary control of the valve 140, based upon characterization data 184 obtained using nitrogen, to maintain 100 percent flow through the MFC 100. As shown in this example, the multi-mode control component 172 switches to an open-loop mode of operation at point (P1, V1)(e.g., due to a rate of change of the pressure exceeding a threshold), and while operating in the open-loop mode, pressure readings from the pressure sensor 178 are used in connection with the characterization 184 to control the valve 140 to maintain 100 percent flow as the pressure changes.

In the example depicted in FIG. 4A, while operating in the open-loop mode of operation, the pressure drops to P2, and the control component 170 decreases the position of the valve 140 to V2. At the point (V2, P2) in this example, the multi-mode control component 172 switches back to a closed-loop mode of operation (e.g., due to a rate of the pressure change falling below a threshold or due to a timer expiring). If the valve 140 was correctly controlled during the open-loop mode of operation, when the multi-mode control component 172 switches back to the closed-loop mode of operation at point (V2, P2), the actual flow should be 100 percent flow.

If the process gas is nitrogen, the actual flow of the gas is likely to be very close to 100 percent because the characterization data 184 in this example was generated using nitrogen. But if the process gas is not nitrogen, due to different properties of the gas, the pressure insensitivity performance of the mass flow controller 100 may degrade severely.

As a consequence, the adaptive characterization component 174 generally operates to adjust the characterization data 184 during tool operation to accommodate the operational variances of arbitrary process gases; thus the adaptive characterization component 174 enables the multi-mode control component 172 to adapt to the particular process gas that is used.

As discussed further herein, to determine an appropriate adjustment, once the mass flow controller 100 is operating in the open-loop mode (e.g., because a pressure deviation occurred), the adaptive characterization component 174 obtains a measured flow reading at the moment when the closed-loop mode is being started again. And depending upon a flow error and a direction of pressure change at the moment when the closed-loop mode is started again, the corresponding characterization value is increased or decreased.

Figure 4B:
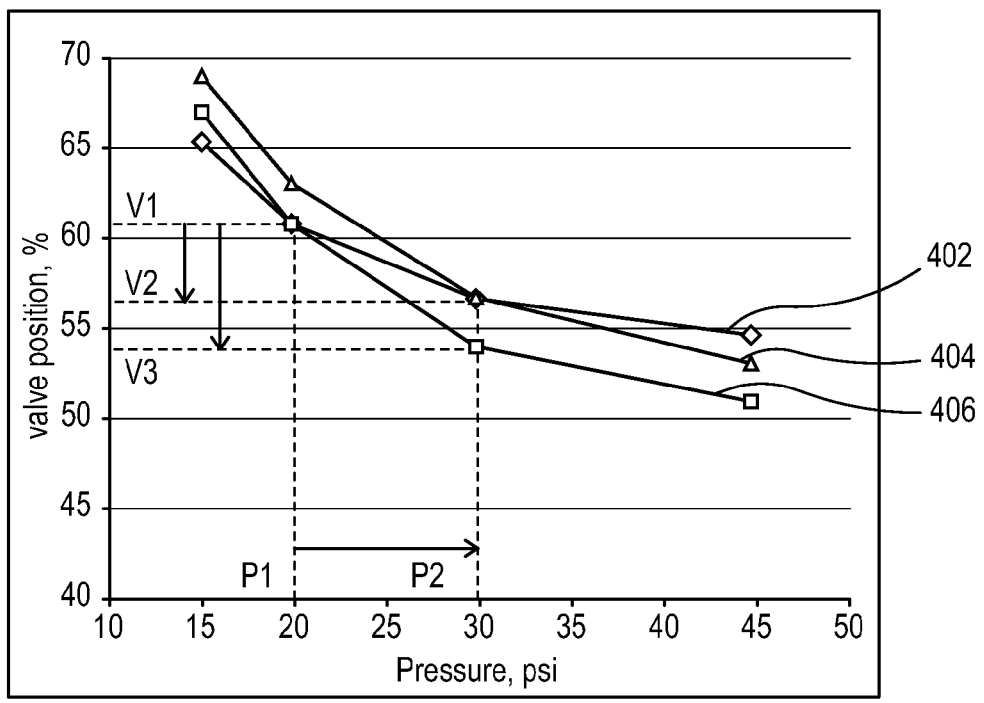
FIG. 4B is a graph depicting events leading to an adjustment of characterization data.

Referring to FIG. 4B, it is a graph that includes the following three curves that are utilized to illustrate an exemplary series of events leading to an adjustment of the characterization data 184 to provide 100 percent flow when a process gas (instead of nitrogen) is controlled: an unadjusted valve position curve 402 for nitrogen, a 110 percent flow curve 404 for the process gas, and a desired valve position curve 406 (to provide 100 percent flow) for the process gas. The unadjusted valve position curve 402 represents the position of the valve 140 versus pressure when characterization data 184 (that is unadjusted) is utilized to control the valve 140 during an open-loop mode of operation. The 110 percent flow curve 404 represents valve positions versus pressure that would provide a 110 percent flow rate for the process gas, and the desired valve position curve 406 represents valve positions versus pressure that would provide the desired 100 percent flow of the process gas.

As shown in this example, at point (V1, P1), the multi-mode control component 172 switches from a closed-loop mode of operation to an open-loop mode of operation (e.g., because the rate at which the pressure was decreasing just before (V1, P1) exceeded a threshold). And as shown, when the process gas is controlled using characterization data 184 that is unadjusted, the valve position of the valve 140 at pressure P2 is V2, which is the valve position that provides 110 percent flow when the process gas (instead of nitrogen) is controlled. In contrast, to provide 100 percent flow for the process gas at pressure P2, the valve position needs to be at position V3.

As a consequence, in this example when the characterization data 184 is unadjusted, the flow rate is too high (i.e., because the position of the valve is more open, at about 57 percent, when the valve position should be about 54 percent open). In this example, at pressure P2, the multi-mode control component 172 switches back to the closed-loop mode of operation and an adjustment to the characterization data 184 is calculated based on a relation to a difference between a measured flow rate (corresponding to the actual valve position V2) and a flow set point (corresponding to a desired valve position V3) so that the next time the multi-mode control component 172 switches to the open-loop mode of operation, the position of the valve 140 more closely tracks the desired valve position curve 406 than the unadjusted valve position curve 402.

The adaptive characterization component 174 may apply the adjustment to the characterization data 184 by changing existing valve position values in the characterization data 184 (e.g., by the optional communication from the adaptive characterization component 174 to the characterization data 184); by adding additional data to the characterization data 184; or the characterization data 184 may remain the same (e.g., as it was generated by the manufacturer or supplier) and the adaptive characterization component 174 applies a scaling factor to the characterization data 184.

In implementations where the characterization data 184 remains the same and a scaling factor is applied, the scaling coefficient K, may be calculated as follows: K=(V3−V1)/(V2−V1), but it is certainly contemplated that other scaling factors may be used. And this scalar K is used to adjust how the valve 140 is controlled by the characterization data 184 in the open-loop mode. In. FIG. 4B, for example, K is approximately equal to (54%−61%)/(56%−61%) or 1.4. The scalar 1.4 is indicative of how much more the valve 140 needs to move so that after the open-loop mode of operation ends at pressure P2, the position of the valve 140 is closer to (P2, V3). In this example, without adjustment, the characterization data 184 dictates that the valve 140 moves from about 61% (at V1) to 56% (at V2), (about 5% difference) so the scalar 1.4 is multiplied by the 5% difference to obtain an adjusted difference of −7%.

As a consequence, when the open-loop mode is engaged again (under the same changes in pressure), the position of the valve 140 at P2 when the open-loop mode of operation ceases is (61% (at V1) minus 7%) or 54%. To arrive at adjusted valve positions between P1 and P2 (so the valve position more closely tracks the desired valve position curve 406), the value of the scaling factor K for each pressure value between P1 and P2 may be calculated by interpolation.

Alternatively, instead of calculating a new coefficient as discussed above, incremental adjustments can be made to the coefficient during each iteration in which the multi-mode control component 172 changes from the open-loop mode to the closed-loop mode. These incremental adjustments can be made until a difference between a measured flow and a flow set point (at the moment when the multi-mode control component 172 switches from the open-loop mode to the closed-loop mode) falls below a threshold.

In implementations where the characterization data 184 is augmented or changed, the characterization data 184 may store adjusted characterization data for each process gas. Or in other variations, adjusted characterization data for a plurality of process gases may be uploaded (e.g., by communication links well known to those of skill in the art) to a remote storage location and stored externally from the MFC 100, and then the characterization data may be retrieved when needed.

Figure 5:
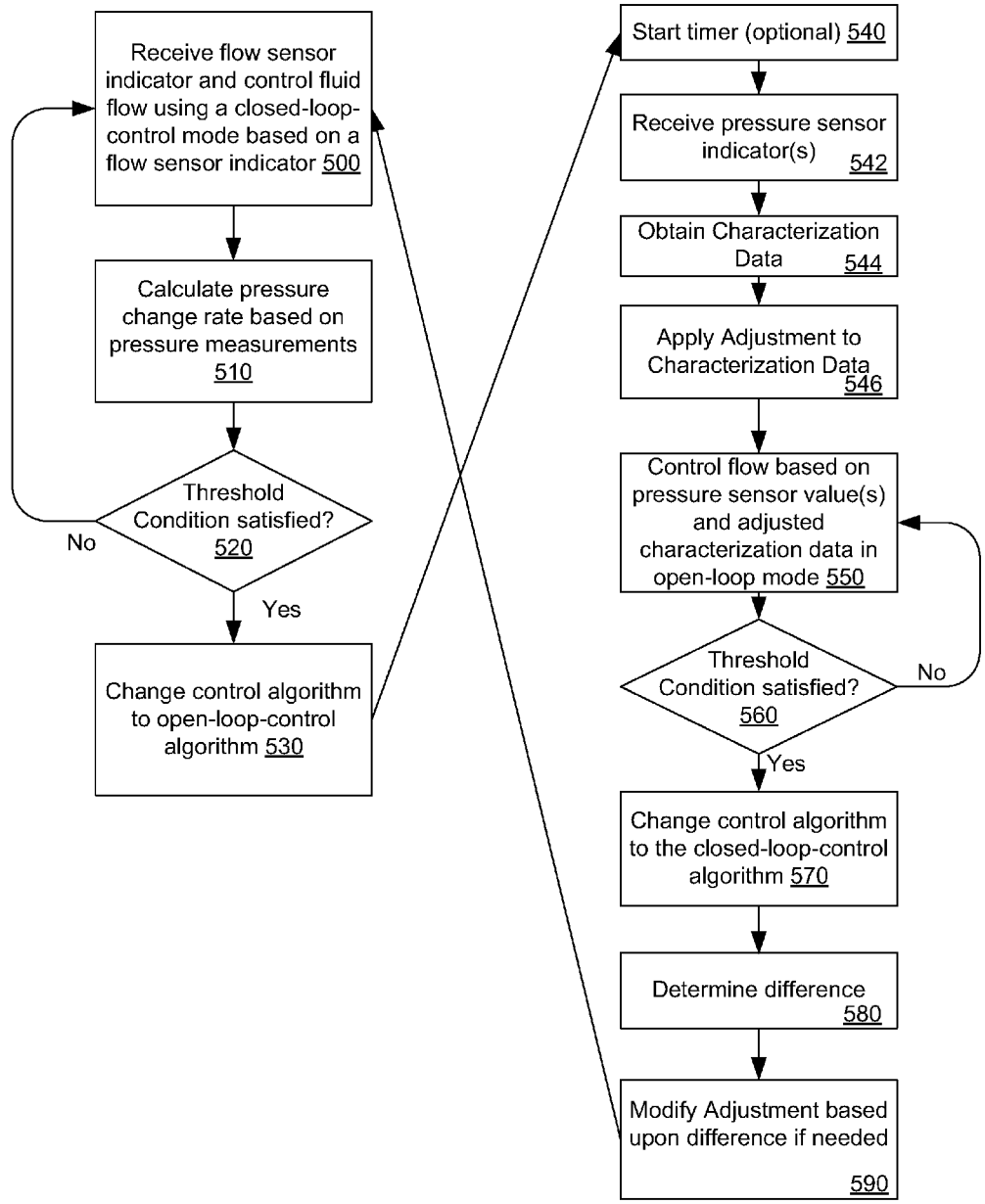
FIG. 5 is a flowchart that shows an adaptive multi-mode control method, according to an embodiment of the invention.

FIG. 5 is a flowchart that shows an adaptive multimode control method that may be carried out in connection with the embodiment depicted in FIG. 1. As shown in FIG. 5, a flow sensor indicator indicating a fluid flow measurement is received and a flow of a fluid is controlled using a closed-loop mode based on the flow sensor indicator (e.g., the processed-representation 150' of the output signal 150) and a fluid flow set point (e.g., the a set point signal 186) at 500. As shown, a pressure change rate is calculated based on pressure measurements (e.g., a difference between at least two pressure measurements over a specified period of time) at 510. If the pressure change rate does not exceed a defined pressure change threshold value at 520, the flow sensor indicators (i.e., flow sensor measurements) continue to be received and fluid flow continues to be controlled using the closed-loop mode at 500. The operations in blocks 500-520 are, in many embodiments, performed/executed concurrently or at substantially the same time.

When the calculated pressure change rate at 510 exceeds the pressure change threshold value at 520 (e.g., if the calculated pressure change rate exceeds 1 pound per square inch per second), the multi-mode control component 172 changes its operation from the closed-loop mode to the open-loop mode at 530, and optionally, a timer is started at 540, and in instances where the timer is utilized, it may run for a time period of 3 seconds, but other time lengths are certainly contemplated.

As shown, pressure sensor indicators are received from the pressure sensor 178 and the multi-mode control component 172 controls the fluid flow in the open-loop mode based on the pressure sensor indicators at 542. The pressure change rates may be continuously or intermittently calculated at 542 based on pressure measurements received from the pressure sensor 178.

As shown at 544 characterization data 184, which is utilized to convert pressure readings into valve position accurately (to provide a fluid flow rate that is sufficiently close, or equal, to the fluid flow level corresponding to the setpoint 186), is obtained and utilized during the open-loop mode. In many embodiments the characterization that is carried out to generate characterization data 184 is performed as part of a manufacturing process (e.g., carried out by a manufacturer or supplier of the MFC 100) before the mass flow controller 100 is utilized in a processing environment. In many instances, for example, the characterization is carried out using nitrogen gas ($N_2$), and as a consequence, the mass flow controller 100 exhibits good pressure insensitivity when nitrogen is the process gas. But as discussed above, if the process gas is not nitrogen, due to different properties of the gas, the pressure insensitivity performance of the mass flow controller 100 may degrade severely.

Figure 6A:
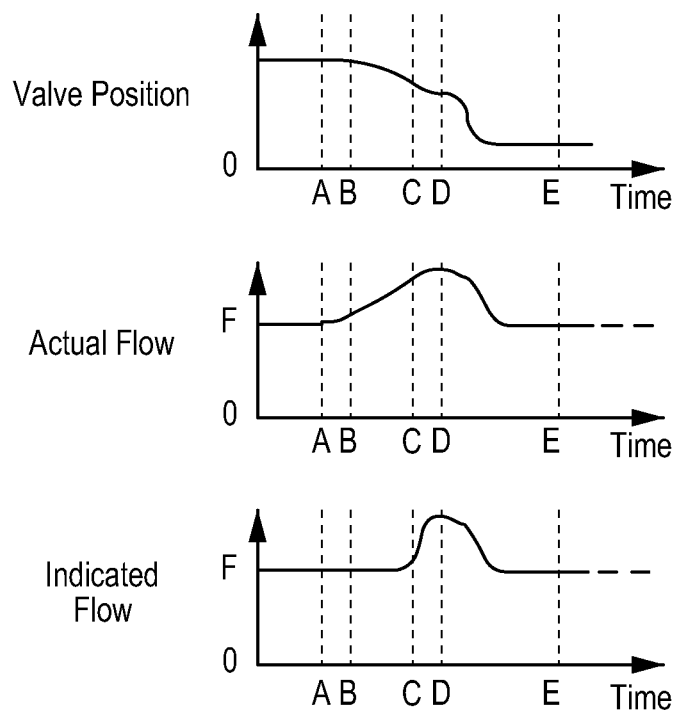
FIG. 6A depicts valve position, actual flow, and indicated flow of an exemplary valve operating in an under-compensated state.

Referring briefly to FIG. 6A for instance, if the flow is less sensitive to valve position for some gas other than nitrogen at a specific flow set point, the valve displacement during the open-loop control mode during the interval BC will not be enough to maintain a requested flow, and the control of the valve is considered to be under-compensated. More specifically, if pressure is increasing, but valve position is not decreased enough to compensate for the increasing pressure, an actual flow will increase during the open-loop control mode so that the indicated flow provided by processed-representation 150' of the output signal 150 will show a positive spike when the MFC 100 returns to the closed-loop mode of operation.

Figure 6B:
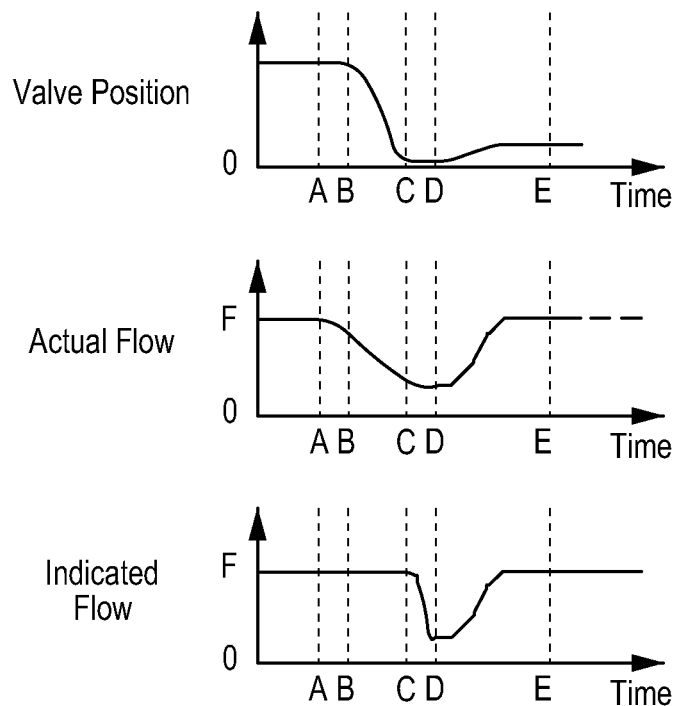
FIG. 6B depicts valve position, actual flow, and indicated flow of an exemplary valve operating in an over-compensated state.

Similarly, as shown in FIG. 6B, if the flow is more sensitive to valve position for a gas other than nitrogen at specific flow set point, the valve displacement during the open-loop control will be too large for maintaining requested flow, and the control of the valve is considered to be over-compensated. More specifically, if pressure is increasing, but valve position is decreased more than required to compensate for the increasing pressure, an actual flow will decrease during open-loop control mode interval, so that the indicated flow will show a negative spike when the MFC 100 returns to closed-loop mode.

As a consequence, in many embodiments, as depicted in FIG. 5 at 546, an adjustment is applied to the characterization data 184, and at 550 the flow is controlled based upon pressure sensor values and the adjusted characterization data in open-loop mode. As discussed further herein, in some implementations, the characterization data 184 remains unchanged (e.g., unchanged from the values that were generated by the manufacturer or supplier of the MFC 100) and the adaptive characterization component 174 applies a variable adjustment to the characterization data 184. In other optional implementations, the adaptive characterization component 174 applies adjustments to the characterization data 184 at step 590 (discussed further herein) by changing the existing characterization data 184 and/or adding new data to the characterization data 184.

In some implementations, if calculated pressure-change rates continue to exceed a pressure-change-rate threshold value at 560, pressure measurements continue to be received and fluid flow is controlled using the open-loop mode at 550. And when the calculated pressure change rate falls below the threshold value at 560, the multi-mode control component switches from the open-loop mode back to the closed-loop mode at 570. In other implementations, the threshold is a time threshold and the optional timer triggered at 540 determines when the multi-mode control component 172 returns to the closed-loop mode.

If the threshold at 560 is based upon time, in some embodiments, the length of the time period depends on factors such as a response time of flow controllers or a deviation of pressure measurements above the corresponding threshold value. For example, in several embodiments, the time period used by the timer is extended and/or shortened when a pressure change within a specified period of time exceeds and/or falls below a threshold value by a specified amount. The time period of the timer, in yet other embodiments, is modified (e.g., extended or shortened) when a later pressure change or pressure change rate is detected after the timer has started.

It is also contemplated that one or more threshold conditions may be defined to use a combination of threshold conditions/values such as, for example, a pressure change rate value and a timer.

As depicted, once the threshold is met at 560, the multi-mode control component 172 changes to operate in the close-loop mode of operation. And at 580, a difference between the measured flow rate (that is indicated by processed-representation 150' of the output signal 150 when the closed-loop algorithm mode is being started again) and a flow set point (that is indicated by the setpoint signal 186) is determined. Then at 590, an adjustment to the characterization data is modified based upon the difference to improve an accuracy of the calculation of the valve position when the feedback control loop is disengaged again at 530.

For instance, in FIG. 6A a positive flow error is detected at the end of open-loop control interval (point D). Since pressure increased, the valve displacement was "under-compensated," and a corresponding correction value should be increased. In FIG. 6B a negative flow error is detected, so the corresponding correction value should be decreased. An amount of adjustment depends on flow error and peak parasitic flow value.

In conclusion, the present invention provides a system and method for controlling a flow of a fluid using a multi-mode control algorithm. Those skilled in the art can readily recognize that numerous variations and substitutions may be made in the invention, its use and its configuration to achieve substantially the same results as achieved by the embodiments described herein. Accordingly, there is no intention to limit the invention to the disclosed exemplary forms. Many variations, modifications and alternative constructions fall within the scope and spirit of the disclosed invention as expressed in the claims.

What is claimed is:

1. A mass flow controller comprising:
 a valve that is adjustable to control a flow rate of a fluid responsive to a control signal;
 a pressure transducer that provides a pressure signal that indicates a pressure of the fluid;
 a thermal mass flow sensor that provides a measured flow rate of the fluid;
 a memory to store characterization data that relates flow values to valve position values for each of a plurality of pressure values;
  a control system that disengages a feedback control loop when a rate of pressure change of the fluid satisfies a threshold condition, and when the feedback control loop has been disengaged, the control system controls the valve based upon the pressure signal and the characterization data that is adjusted based upon any differences between set point signals and corresponding measured flow signals obtained each time the feedback control loop is re-engaged, and wherein the control system changes the characterization data responsive to any differences between set point signals and corresponding measured flow signals obtained each time the feedback control loop is re-engaged.

2. The mass flow controller of claim 1, wherein the control system reengages the feedback control loop when a timer has expired.

3. The mass flow controller of claim 1, wherein the control system reengages the feedback control loop when the rate of pressure change of the fluid falls below the threshold condition.

4. A mass flow controller comprising:
 a valve that is adjustable to control a flow rate of a fluid responsive to a valve control signal;
 a pressure transducer that provides a pressure signal that indicates a pressure of the fluid;
 a memory to store characterization data that relates flow values to valve position values for each of a plurality of pressure values;
 a thermal mass flow sensor that provides a measured flow rate of the fluid; and a control system including:
- a processor to control the valve with the valve control signal responsive to a set point signal; and
- a non-transitory, tangible processor readable storage medium coupled to the processor, encoded with processor readable instructions for controlling the valve when executed by the processor, the instructions comprising instructions for:

controlling the valve using a feedback control loop, the feedback control loop controlling the valve based upon a difference between the measured flow rate and the set point signal;

receiving the pressure signal generated by the pressure transducer;

disengaging, responsive to a rate of pressure change of the fluid satisfying a threshold condition, the feedback control loop;

calculating a valve position of the valve based on the pressure signal when the feedback control loop has been disengaged and the characterization data;

re-engaging the feedback control loop after one of a time period or threshold condition is met;

determining, when the feedback control loop is first re-engaged, a difference between the measured flow rate and the set point signal; and applying an adjustment to the characterization data based upon the difference to improve an accuracy of the calculation of the valve position when the feedback control loop is disengaged again.

5. The mass flow controller of claim 4, wherein the instructions include instructions for:
modifying a scaling factor based upon the difference;
wherein adjusting the characterization data includes multiplying the characterization data by the scaling factor without modifying the characterization data.

6. The mass flow controller of claim 4, wherein applying the adjustment includes changing how much the valve position moves when there is a change in pressure while the feedback control loop is disengaged.

7. The mass flow controller of claim 4, wherein the time period is based upon a magnitude of the pressure change.

8. The mass flow controller of claim 4, wherein the instructions include instructions for:
monitoring, while the feedback control loop is disengaged, a pressure of the fluid;
wherein the threshold condition is the rate of pressure change falling below a particular level.

9. A mass flow controller comprising:
- a valve that is adjustable to control a flow rate of a fluid responsive to a control signal;
- a pressure transducer that provides a pressure signal that indicates a pressure of the fluid;
- a thermal mass flow sensor that provides a measured flow rate of the fluid;
- a memory to store characterization data that relates flow values to valve position values for each of a plurality of pressure values;
- a control system that disengages a feedback control loop when a rate of pressure change of the fluid satisfies a threshold condition, and when the feedback control loop has been disengaged, the control system controls the valve based upon the pressure signal and the characterization data that is adjusted based upon any differences between set point signals and corresponding measured flow signals obtained each time the feedback control loop is re-engaged, and wherein the control system changes the characterization data responsive to any differences between set point signals and corresponding measured flow signals obtained each time feedback control loop is re-engaged, and wherein the control system does not change the characterization data in the memory and applies a scaling factor to the characterization data responsive to any differences between set point signals and corresponding measured flow signals obtained each time the feedback control loop is re-engaged.

10. The mass flow controller of claim 9, wherein the control system reengages the feedback control loop when a timer has expired.

11. The mass flow controller of claim 9, wherein the control system reengages the feedback control loop when the rate of pressure change of the fluid falls below the threshold condition.

* * * * *